S. P. SWEENY.
Cotton-Planter
No. 27,748.                                              Patented Apr. 3, 1860.
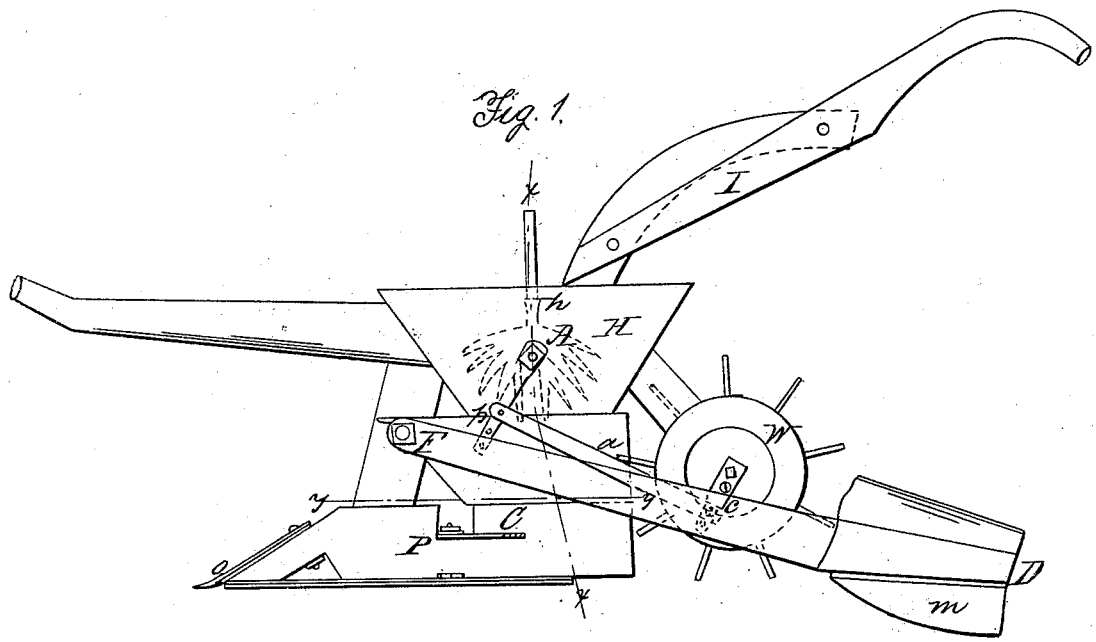
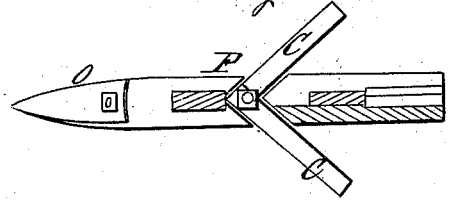
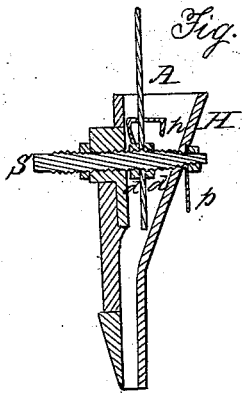
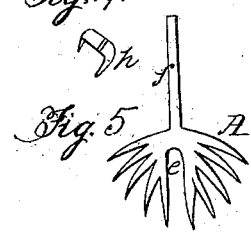
Witnesses:
Jas. D. Clay
J. C. Coght
Inventor:
S. P. Sweeny
per Geo. P. Allen
atty.

UNITED STATES PATENT OFFICE.

SAML. P. SWEENY, OF COLUMBIA, TEXAS.

IMPROVEMENT IN COTTON-SEED PLANTERS.

Specification forming part of Letters Patent No. 27,748, dated April 3, 1860.

*To all whom it may concern:*

Be it known that I, S. P. SWEENY, of Columbia, in the county of Brazoria and State of Texas, have invented a new and useful Improvement in Cotton-Seed Planters; and I do hereby declare that the following is a full, clear, and exact description of the same, reference being had to the annexed drawings, forming a part of this specification, in the several figures of which similar characters of reference denote the same part.

Figure 1 is a side view of the planter. Fig. 2 is a horizontal section on $y\ y$. Fig. 3 is a section on $x\ x$. Fig. 4 is a view of loose stirrer. Fig. 5 is a view of adjustable agitator.

In the drawings, H is the hopper, across which is a screw rock-shaft, S, driven by connections $a$ with arms $b$ and $c$, the former on the shaft S, and the latter on the shaft of driving-wheel W.

On the shaft S is the agitator A, in form as shown in Fig. 5, and secured on shaft by being between nuts $d\ d$, and, by reason of slot $e$, capable of vertical adjustment. If desired, there may be two or more of these agitators on the shaft operating in opposite or in the same direction. The arm $f$ of the agitator runs up in the hopper, and has upon it a movable self-adjusting stirrer, $h$, which rests on the seed and forces it down to the bottom of the hopper to be forced through the slotted bottom by the agitator or discharging apparatus A.

O is the opener upon the long furrow-smoother P, from any portion of the sides of which extend the cutters C C for cutting away weeds and other trash that may be above the surface of the ground.

D is the coverer, hung to bar F and with the blades $m$, in form seen in Fig. 1, and approaching each other at rear, so as to draw the earth into the furrow.

W is the driving-wheel, which by rotation operates the discharging apparatus A in the hopper. The extent of the oscillations is governed by the holes in arms $b$ and $c$.

The apparatus rests on a beam, and is governed by handles I. This construction admits of the hopper and other planting parts being removed, when the remainder can serve as a plow.

What I claim, and desire to secure by Letters Patent, is—

1. The adjustable oscillating planting apparatus A, constructed and operating as described.

2. The combination of the stirrer $h$ and agitator A, as described.

3. The arrangement of coverer D, driving-wheel W, hopper H, cutters C C, stock P, and opener O, as and for the purposes set forth.

In testimony whereof I have hereunto signed my name before two subscribing witnesses.

SAM P. SWEENY.

Witnesses:
GEO. PATTEN,
F. G. MYER.